Figure 1:
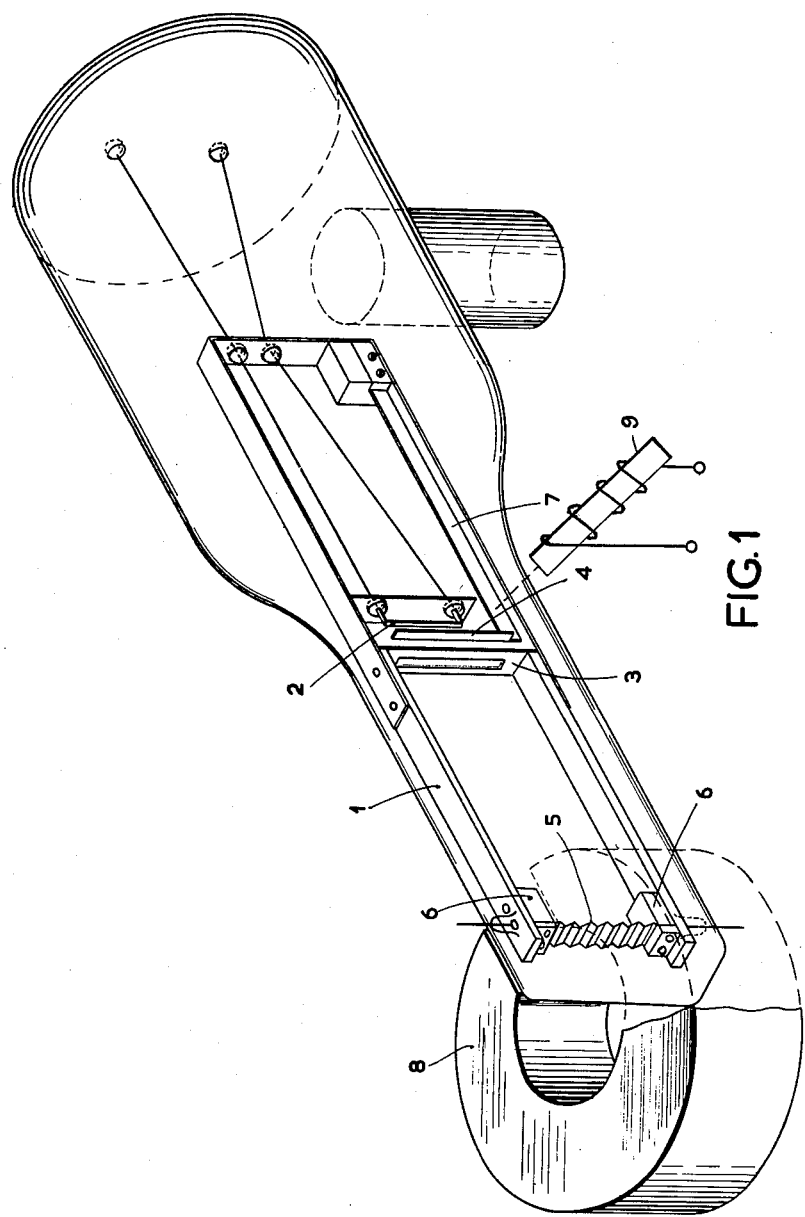

May 30, 1961   N. W. ROBINSON   2,986,037
VACUUM PRESSURE GAUGES
Filed Nov. 25, 1957   2 Sheets-Sheet 1

INVENTOR
NORMAN WRIGHT ROBINSON
BY
AGENT

United States Patent Office 2,986,037
Patented May 30, 1961

2,986,037
VACUUM PRESSURE GAUGES
Norman Wright Robinson, Carshalton Beeches, England, assignor to North American Philips Company, Inc., New York, N.Y.
Filed Nov. 25, 1957, Ser. No. 698,825
Claims priority, application Great Britain Nov. 28, 1956
6 Claims. (Cl. 73—388)

This invention relates to apparatus for measuring low gas pressures which is based on the thermo-molecular pressure effect and in which gas molecules emanating from a heated member impart a displacement to a resilient member.

Apparatus of the above-mentioned kind is known under the name of Knudsen manometer. In this manometer, provision is made of an element which is heated to a temperature of from 100° C. to 200° C. so that molecules striking this element assume the velocity associated with this temperature and, if they strike the cold resilient member, exert a pressure thereon such that a displacement of the resilient member must be observed with the aid of a microscope or be read with the aid of a light spot and a mirror mounted on the resilient member. Generally, these methods are not satisfactory for performing rapid observations or observations in a factory. It is an object of the present invention to provide an improved apparatus.

According to the invention, in an apparatus for measuring low gas pressures which is based on the thermo-molecular pressure effect and in which molecules emanating from a heated element impart a displacement to a resilient member, means are provided for periodically interrupting the bombardment of the resilient member by the gas molecules so that this resilient member itself is caused to effect an intermittent movement from which an electrical signal can be derived.

According to the invention the electrical signal can be produced by designing the resilient member as an electrical conductor which is arranged at right angles to the lines of force of a magnetic field so that on movement of the conductor a voltage can be taken across its ends. Alternatively, according to the invention the resilient member together with a fixed member constitutes an electrical capacitor the value of which varies on movement of the resilient member.

According to the invention, the interruption of the gas stream is obtained with the aid of a shutter which moves between the heated element and the resilient member.

In order to reduce to a minimum, the influence of the interrupted radiation pressure owing to the infrared and, as the case may be visible radiation emanating from the heated member according to the invention a transparent shutter can be used.

Alternatively, according to the invention a source of radiation can be provided on the other side which is covered by the non-transparent shutter simultaneously with the interruption of the molecular bombardment.

The measures relating to the radiation pressure become significant at pressures of the order of $10^{-8}$ mm. of mercury and temperatures of the heated element exceeding 800° C.

Figure 2:
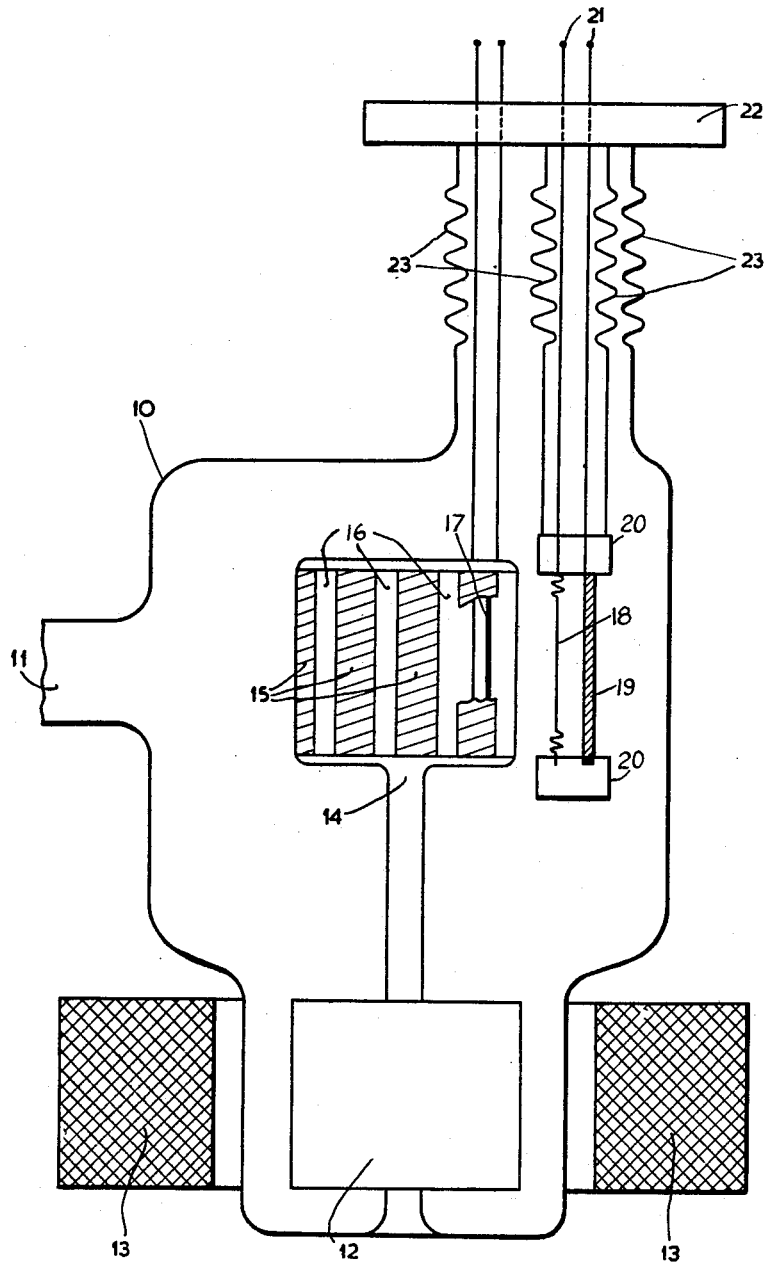

In order that the invention may readily be carried into effect, two embodiments thereof will now be described, by way of example, with reference to the accompanying drawing, in which Fig. 1 shows an apparatus in accordance with the invention provided with a vibrating shutter and Fig. 2 shows an apparatus provided with a rotating shutter.

In Fig. 1, reference numeral 1 denotes a rectangular glass tubing which is connected to the space in which the pressure must be measured. A heating element 2 in the form of a platinum strip is arranged at right angles to the tubing axis. An aperture 3 with an associated shutter 4 is also located at right angles to the tubing axis between the heating element 2 and a resilient member 5. The latter comprises a corrugated aluminium ribbon which is clamped in box 6. The shutter 4 is mounted on a spring 7 so that after being displaced from its initial position the shutter reciprocates past the aperture 3. The initial displacement can be achieved by means of an electro-magnet 9. Since at the low pressures the damping is very slight, this vibration must only be initiated occasionally. By the passage of current the platinum strip 2 can be heated to about 1000° C. The frequency at which the shutter 4 moves may be 30 times per second, the ribbon 5 being bombarded at twice this frequency. The ribbon 5 moves owing to the intermittent bombardment in the field of the magnet 8 so that a voltage can be taken across the terminals of the blocks 6.

Generally the impedance of the aluminium ribbon 5 must be stepped up for further amplification.

In order to prevent the intermittent radiation pressure from influencing the results at very low pressures, the shutter 4 can be designed as a thin plate of quartz which is permeable to the radiation of the strip 2.

In Fig. 2, reference numeral 10 denotes the manometer housing which is connected through an aperture 11 to the space the pressure in which must be measured. Within the housing 10 there is arranged a rotor 12 of an electric motor of the type used in rotating anode X-ray tubes. 13 denotes the stator of this motor. The rotor 12 carries a cylindrical cage 14 the side-wall of which is constructed of a number of quartz plates 15 which act as shutters and are separated by gaps 16. Within the cage 14 provision is made of a heating element 17 positioned opposite a flexible member 18 outside the cage. Directly behind the flexible member 18 there is positioned a fixed member 19 which together with 18 constitutes a capacitor. 18 and 19 both secured to supporting blocks 20. The members 18 and 19 are provided with supply leads 21.

In order to reduce to a minimum the influence of vibrations produced by the rotating rotor, the heating element 17 and the capacitor comprising 18 and 19 are mounted on the stationary part of the apparatus which is designated 22 and is connected to the housing 10 by means of a bellow 23.

In the operation of the apparatus, the cage is rotated by means of the motor so that the member 18 is intermittently bombarded by molecules travelling from the heating element 17 with the result that the capacitor comprising 18 and 19 is subjected to periodic variations. This apparatus enables higher frequencies to be used than with the apparatus shown in Fig. 1.

I claim:

1. An apparatus for measuring low gas pressures based on the thermo-molecular pressure effect comprising a glass tubing, a heating element in said glass tubing, a resilient member, means mounting said resilient member in said glass tubing in spatial relation from said heating element, the molecules projected from the heating element bombarding said resilient member to thereby displace the latter, means influenced by the displacement of said resilient member to cause an electrical signal to be derived, and shutter means located between said heating element and said resilient member for periodically interrupting the bombardment of said gas molecules.

2. An apparatus for measuring low gas pressures based on the thermo-molecular pressure effect comprising a glass tubing, a heating element in said glass tubing, a resilient member, a magnet, means mounting said resilient member in said glass tubing in spatial relation from said heating element and at substantially right angles to the lines of force of said magnet, the gas molecules projected from the heating element bombarding said resilient member to thereby displace the latter, and shutter means located between said heating element and said resilient member for periodically interrupting the bombardment of said gas molecules whereby the resilient member itself is caused to perform an intermittent movement from which an electrical signal is derived.

3. An apparatus for measuring low gas pressures based on the thermo-molecular pressure effect comprising a glass tubing, a heating element in said glass tubing, a resilient member, a fixed member, means mounting said resilient and fixed members in said glass tubing and spaced from said heating element whereby an electrical capacitor is formed having a value which varies upon the movement of said resilient member, the gas molecules projected from the heating element bombarding said resilient member to thereby displace the latter, and shutter means located between said heating element and said resilient member for periodically interrupting the bombardment of said gas molecules whereby the resilient member itself is caused to perform an intermittent movement from which an electrical signal is derived.

4. An apparatus for measuring low gas pressures as claimed in claim 2 wherein said shutter is constituted of material which is permeable to infrared and visible radiation.

5. An apparatus for measuring low gas pressures as claimed in claim 2 further comprising a spring adapted to vibrate and on which said shutter means is mounted.

6. An apparatus for measuring low gas pressures based on the thermo-molecular pressure effect comprising a glass tubing, a heating element in said glass tubing, a resilient member, a fixed member, means mounting said resilient member and fixed member in said glass tubing in spatial relation from said heating element whereby an electrical capacitor is formed having a value which varies upon the movement of said resilient member, the molecules projected from the heating element bombarding said resilient member to thereby displace the latter, and shutter means comprising a rotating cylinder with a plurality of openings in its periphery, said heating element being located in said cylinder, said shutter means periodically interrupting the bombardment of said gas molecules whereby the resilient member itself is caused to perform an intermittent movement from which an electrical signal is derived.

References Cited in the file of this patent

UNITED STATES PATENTS

| | | |
|---|---|---|
| 2,497,129 | Liston | Feb. 14, 1950 |
| 2,602,332 | Turner et al. | July 8, 1952 |
| 2,655,044 | Du Mond | Oct. 13, 1953 |
| 2,780,099 | Kuipers | Feb. 5, 1957 |
| 2,825,817 | North | Mar. 4, 1958 |

FOREIGN PATENTS

| | | |
|---|---|---|
| 630,885 | Great Britain | Oct. 24, 1949 |
| 664,788 | Great Britain | Jan. 9, 1952 |